United States Patent [19]
Uchidoi et al.

[11] 4,375,915
[45] Mar. 8, 1983

[54] SHUTTER TIME CONTROL CAMERA

[75] Inventors: Masanori Uchidoi, Yokohama; Kazunobu Urushihara, Inagi, both of Japan

[73] Assignee: Canon Kabushiki Kaisha, Tokyo, Japan

[21] Appl. No.: 337,469

[22] Filed: Jan. 6, 1982

Related U.S. Application Data

[63] Continuation of Ser. No. 230,119, Jan. 29, 1981, abandoned.

[30] Foreign Application Priority Data

Feb. 4, 1980 [JP] Japan ................................. 55-12250

[51] Int. Cl.³ ............................................. G03B 9/62
[52] U.S. Cl. .................................. 354/234; 354/60 R
[58] Field of Search .................... 354/50, 51, 234, 235, 354/60 R

[56] References Cited

U.S. PATENT DOCUMENTS 4,264,176  4/1981  Kawamura et al. ................ 354/234

Primary Examiner—Michael L. Gellner
Attorney, Agent, or Firm—Toren, McGeady & Stanger

[57] ABSTRACT

A camera includes a drive source which generates a driving torque for moving shutter curtains in response to electrical battery power, and controls the running of the shutter curtains by the driving torque from the drive source. When the battery voltage is below a predetermined value, accurate shutter time control is maintained by providing circuitry which alters the shutter time to a certain value which is greater than a preset exposure value, so that exposure error is as small as possible even when the running speed of the shutter curtains is inaccurate due to lower battery voltage.

9 Claims, 4 Drawing Figures

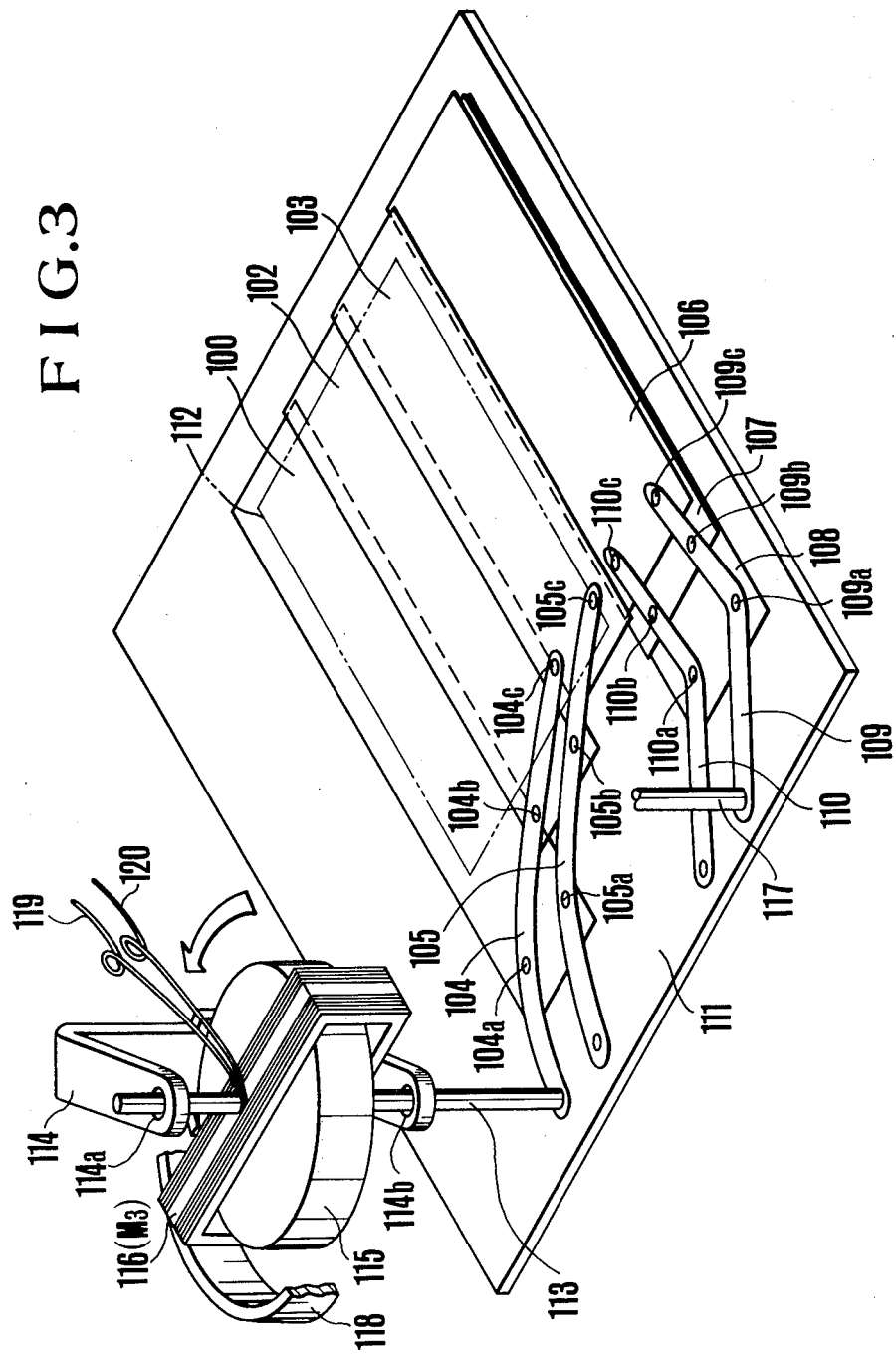

SHUTTER TIME CONTROL CAMERA

This is a continuation of application Ser. No. 230,119 filed Jan. 29, 1981, abandoned.

BACKGROUND OF THE INVENTION

1. Field of the Invention:

This invention relates to cameras, and more particularly to cameras having electromagnetic drive sources.

2. Description of the Prior Art:

Cameras recently have been proposed including shutter curtains which are directly driven by electromagnetic drive sources such as motors, i.e., electrically operated magnet control cameras. Since the shutter is directly driven by an electromagnetic force produced from an electrically operated magnet drive source, that electromagnetic force must always be maintained at a constant magnitude. Otherwise, the shutter time cannot be accurately controlled. In other words, the speed of movement of the shutter curtain is determined by the magnitude of the output of the electromagnetic drive source. Therefore, as the electromagnetic force changes, the running speed of the shutter curtains will also change. This makes it impossible to accurately control the shutter time.

In the case of relatively long shutter times, the above problem is not very noticeable owing to the fact that the period of shutter actuation is long. However, with faster shutter times, the problem is quite serious because the running time error of the shutter curtain largely affects the overall exposure time. Therefore, it is common practice to provide a constant current circuit or other suitable constant electrical power supply means, in order to insure that a constant electromagnetic force can always be obtained from the shutter drive source. Even with such a constant current circuit, however, when the input voltage drops below a predetermined level, a constant output supply current cannot be achieved, and the above-described problem persists.

Another problem with the electric operated magnetic control cameras, which arises from the use of two electromagnetic drive sources to separately control the operation of the leading and trailing curtains of the shutter, is that when the shutter time is so small that the periods of actuation of the leading and trailing curtains partially overlap each other, the electrical energy consumed during the overlapping period becomes large. Therefore, when the shutter time is set at such a small value and the battery voltage is low, not only is an incorrect exposure time provided, but, as the battery voltage drops to less than a satisfactory operating level for the electromagnetic drive sources as the shutter is running, the shutter curtain stops from moving further thereby leaving the exposure aperture partly open.

SUMMARY OF THE INVENTION

An object of the present invention is to provide a camera which is capable of changing its shutter time to a greater value than one which has been previously set upon lowering of battery voltage below the level necessary to provide an electromagnetic force of constant magnitude.

Another object of the present invention is to provide a camera of the type in which the shutter is driven by an electromagnetic drive source, and which operates so that when the battery voltage falls below a predetermined level, the shutter time is reset to a certain greater value, thereby preventing exposure error due to deviation of the speed of movement of the shutter curtain.

Still another object of the present invention is to provide a camera in which the shutter is driven by electromagnetic drive sources and arranged so that if a reduction in the battery voltage below the necessary level for constant speed operation of the electromagnetic drive source is detected when the shutter is to be actuated, the shutter time is automatically increased, thus minimizing exposure error caused by inaccurate control of the running speed of the shutter curtain.

A further object of the invention is to provide a camera in which the shutter is driven by electromagnetic drive sources and arranged so that if the battery voltage drops at a time during the period of actuation of the shutter, so that the shutter is no longer driven, the trailing curtain of the shutter is immediately run down to terminate the exposure even before the end of a time interval equal either to the preset value of shutter time, or to the computed exposure time based on the sensed object brightness, wherein the exposure aperture is prevented from being left open.

These and other objects and features of the present invention will become apparent from the following detailed description of embodiments thereof taken in conjunction with the accompanying drawings.

BRIEF DESCRIPTION OF THE DRAWINGS

FIG. 2(*b*) is an electrical circuit diagram of an example of an analog switch AS of FIG. 1.

FIG. 3 is a perspective view of an example of an electromagnetic drive source of FIG. 1 with a shutter mechanism being controlled by said drive source.

DESCRIPTION OF THE PREFERRED EMBODIMENT

Figure 1:
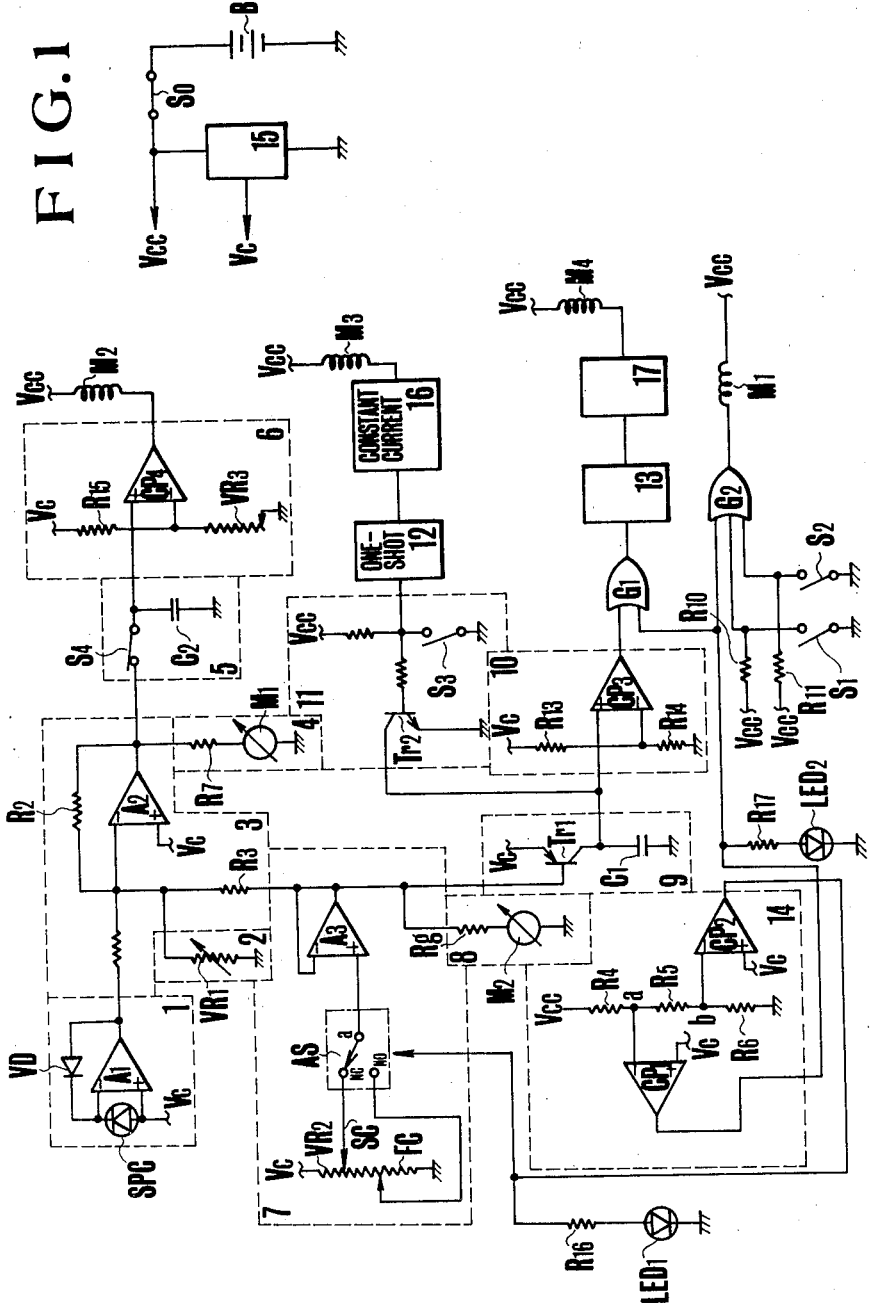
FIG. 1 is an electrical circuit diagram of one embodiment of a camera according to the present invention.

FIG. 1 shows the circuitry of a single lens reflex camera embodying the present invention. The circuitry includes a light measuring circuit 1 including a light-sensitive element SPC, an operational amplifier A1 having inputs across which is connected the light-sensitive element SPC, and a diode VD for logarithmic compression connected in the feedback network of the operational amplifier A. The circuit 1 produces an output BV representative of the object brightness level. An exposure factor setting circuit 2 sets exposure factors such as film sensitivity, said circuit including a variable resistor VR1. A computer circuit 3 including a resistor R2 and an operational amplifier A2. This computer circuit 3 operates the output BV from the light measuring circuit 1, the set information from the information setting circuit 2 and preset time information TV from a shutter time information setting circuit 7 to be described later, and produces an output representative of aperture value information AV necessary to obtain a correct exposure. An aperture information display circuit 4 includes a resistor R7 and a meter M1. A memory circuit 5 memorizes the output of the computer circuit and includes a memory switch S4 which is turned off when a mirror (not shown) is flipped upward, and a memory condenser C2. A diaphragm control circuit 6 controls the size of aperture opening in accordance with the stored value on the condenser C2, said circuit including a series circuit of a resistor R15 and a variable resistor VR3 and a comparator CR4. This variable resistor VR3 has a resistance value related to the actually closed down aperture value in response to a known diaphragm control mechanism (not shown). The comparator CP4 compares the ever-changing potential at the output terminal of the above-described series connected circuit as said resistor VR3 changes its resistance value, with the voltage of the condenser C2 corresponding to the effective aperture value, and upon coincidence of the both voltages raises its output to a high level signal. Energization of a diaphragm magnet M2 is terminated in response to the high level signal from the comparator CP4. Thus, the diaphragm setting operation by the diaphragm control mechanism is stopped. By the above-described function of the magnet M2 and diaphragm control circuit 6, the size of an aperture opening is adjusted to the aperture value equal to that stored on the condenser C2.

A shutter time information setting circuit 7 includes a variable resistor VR2 having a resistance value related to the position of a shutter dial (not shown), an analog switch AS and a buffer amplifier A3. Said variable resistor VR2 has a movable contact SC cooperating with the shutter dial and a fixed contact FC. At the contact SC of the resistor a voltage is produced corresponding to a preset value of shutter time, and at the fixed contact FC a voltage is produced corresponding to a predetermined value of shutter time. The latter voltage may be fixed at a value representing, for example, 1/60 second, or a longer shutter time than the maximum value at which the periods of actuation of the leading and trailing curtains of the shutter begin to overlap each other. The magnitude of the corresponding shutter time may be one at which the possible deviation of the running speed of the shutter curtain from the ideal value does not have much influence on the actual exposure value. It is also noted that the analog switch AS is normally set in the NC position, and when a comparator CP2 constituting part of a voltage detecting circuit 14, to be described later, produces a high level signal, it moves to the NO position.

A shutter time information display circuit 8 includes a resistor Rg and a meter M2. A timing circuit 9 includes a delay transistor Tr 1 with its base connected to the output terminal of the above-described amplifier A3, and a timing condenser C1. A switching circuit 10 includes resistors R13 and R14 and a comparator CP3. Said comparator CP3 is inverted and produces a high level signal when the output of the condenser in the above-described timing circuit reaches a predetermined level.

A timing operation control circuit 11 includes a switch S3 which is turned on when upward movement of the mirror is completed, and a transistor Tr2 connected in parallel to the above-described condenser C1.

A one-shot circuit 12 is actuated when the above-described switch S3 is turned on, and produces a pulse of predetermined duration. A constant current circuit 16 is responsive to the pulse from the one-shot circuit 12 for producing a constant current which is then applied to a coil M3 of a motor which acts as the electromagnetic drive source for the leading curtain of the shutter. Accordingly, the leading curtain is driven so as to run down. A one-shot circuit 13 is actuated in response to a high level signal from an OR gate G1, to produce a pulse which is applied to drive a constant current circuit 17. The constant current from the circuit 17 is applied to energize a coil M4 of a motor which acts as the electromagnetic drive source for the trailing curtain of the shutter.

A battery voltage detecting circuit 14 includes a series connected circuit of resistors R4, R5 and R6 and comparators CP1 and CP2. Applied across the above-described series connected circuit in said circuit 14 is an output voltage Vcc of a battery B. At junction points a and b are divided voltages of the battery B. The comparators CP1 and CP2 have their (+) input terminals supplied with a constant voltage from a constant voltage circuit 15, and have their (−) input terminals connected to the above-described junctions a and b respectively. When the battery voltage reaches a first level, the comparator CP2 changes its output to a high level and when a second level is reached, the comparator CP1 changes its output to high level. This first level is determined to be equal to the threshold voltage level for the constant current circuits 16 and 17 to produce the constant current, and this second level to be slightly higher than the voltage value necessary for the resultant output current from the constant current circuits to drive the shutter curtains to run down. Also shown is a release switch S1 which is turned on when a release button is depressed; a shutter cocking completion sensing switch S2; OR gates G1 and G2; a release magnet M1; light-emitting diodes LED 1 and LED 2 indicating respective control modes; and a power switch So.

Figure 2A:
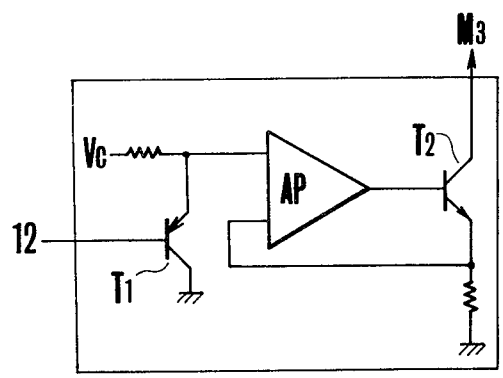
FIG. 2(*a*) is an electrical circuit diagram of an example of a practical constant current circuit 16, or 17 of FIG. 1.
Figure 2B:
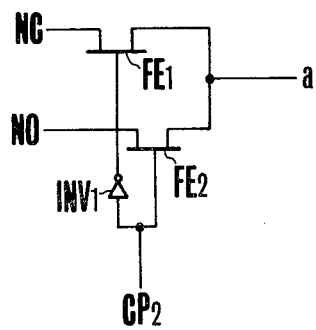

FIG. 2(a) shows the details of construction of the above-described constant current circuits 16 and 17 each including amplifier AP and transistors T1 and T2. The arrangement of these parts is such that the transistor T1 is turned off in response to the output of the one-shot circuit 12, and only when the transistor T1 is in the non-conducting state, a constant current is allowed to flow to the coil M3. The above-described analog switch AS, as shown in FIG. 2(b), is constructed from FETs FE1 and FE2 and an inverter INV1, these parts being arranged wherein the FET FE1 is normally made conducting so that the voltage at an inlet NC is transmitted to an outlet, a, and it is rendered non-conducting by the high level signal from the comparator CP2 which renders conducting the FET FE2, wherein the voltage at an inlet NO is transmitted to a outlet, a.

FIG. 3 is a perspective view of an example of the practical electromagnetic drive source associated with the circuitry of FIG. 1, and of a shutter mechanism to be driven by said drive source. For the purpose to clarifying the drawing and of better understand the following description, a leading blade drive portion only is shown and a trailing blade drive portion is omitted. In FIG. 3, a shutter base plate 111 has an exposure aperture 112. Leading blade drive arms 104 and 105 are made of a light-weight metal such as titanium, titanium system alloy, or aluminium system alloy.

The arm 104 is affixed at one end to a leading blade drive shaft 113, and the parts 113 and 104 are rotatably and pivotally mounted on the shutter base plate 111 respectively. The arm 105 is pivotally mounted at one end on the shutter base plate 111. Leading blades 100, 102 and 103 are in the form of opaque thin plates made of plastics or lightweight metal. The leading blades 100, 102 and 103 are movably mounted on the arms 104 and 105 at pivot pins 104a, 104b, 104c, 105a, 105b and 105c. Trailing blade drive arms 109 and 110 are made of lightweight metal such as titanium, titanium system alloy or aluminium system alloy.

The arm 109 is affixed at one end to a trailing blade drive shaft 117, the parts 109 and 117 being pivotally and rotatably mounted on the shutter base plate. The arm 110 is pivotally mounted at one end on the shutter base plate. Trailing blades 106, 107 and 108 are in the form of opaque thin plates made of plastics or lightweight metal. The trailing blades 108, 107 and 106 are movably mounted on the arms 109 and 110 at pivot pins 109a, 109b, 109c, 110a, 110b and 110c. A frame 114 of the drive source carries a permanent magnet disc 115 magnetized in diametrical directions. The frame 114 is fixedly mounted on the shutter base plate 111 or other suitable member within the camera housing (not shown). A leading blade drive coil 116 (M3 in FIG. 1) of conductive wire of aluminium or aluminium system alloy is turned around a bobbin of electrically insulating material. The leading blade drive coil 116 is affixed to the drive shaft 113. The drive shaft 113 is journalled in support holes 114a and 114b formed in the frame 114. A yoke 118 is arranged in opposition to the permanent magnet disc 115 and is separated from it so as to permit free rotation of the drive coil 116. The yoke is fixedly mounted on a stationary member (not shown) within the camera housing by fastening means (not shown) to form a magnetic circuit.

When the drive coil 116 is supplied with current from the drive circuit through lead wires 119 and 120, a force is exerted in the part of the coil which lies in the magnetic field. This force has a direction perpendicular to the directions of magnetic flux and current flow as will be understood from Fleming's left hand law, and acts as a force couple on the drive shaft 113, so that the leading blade drive coil is rotated in a direction indicated by an arrow (counterclockwise direction as viewed in FIG. 3). The leading blade drive shaft affixed to the drive coil also is rotated in the counterclockwise direction so that the drive arms 104 and 105 are turned counterclockwise. Further, by virtue of the link mechanism the leading blades 100, 102 and 103 are moved upward to initiate an exposure. In a predetermined time interval dependent upon the output of the control circuit after the energization of the leading blade drive coil, the trailing blade drive coil is supplied with current from the drive circuit. Accordingly, the trailing blades 106, 107 and 108 are moved upward to close the exposure aperture 112, thus completing the exposure.

An explanation of the operation of the circuit of FIG. 1, now follows. At first, assuming that the battery voltage is above the first level, then when the power switch So is turned on, the constant voltage circuit 15 produces the constant voltage Vo and the various circuit portions are supplied with current.

Since the battery voltage is above the first level, the comparators CP1 and CP2 each produces a low level signal. Therefore, the analog switch AS is at the NC position where the shutter time information setting circuit 7 produces the information from the tap SC of the variable resistor VR2, that is, the information representing the preset value of shutter time. This information is computed with the brightness information from the light metering circuit 1, and the film speed information from the exposure factor setting circuit 2, by the circuit 3 to produce an output representative of an exposure value. After that, when the release button (not shown) is depressed, the switch S1 is turned on. Since the output of the comparator CP1 is of low level as has been mentioned above, and further since the switch S2 is in an ON state as the shutter is cocked, the actuation of the release causes the OR gate G2 to produce a low level signal. Therefore the magnet M1 initially is energized. The energized magnet M1 actuates a latch member (not shown) and the mirror (not shown) starts to move upward. At the same time, the switch S4 is turned off so that the aperture information is stored on the condenser C2, followed by actuation of the diaphragm control mechanism (not shown) so that the diaphragm starts to close down. As the size of aperture opening is being decreased, the variable resistor VR3 varies its resistance value. When the resistance value coincides with the stored value on the condenser C2, the comparator CP4 changes its output to high level at which time the energization of the magnet M2 is terminated. Thus, the diaphragm aperture is adjusted to the exposure value.

As diaphragm control is carried out, the mirror reaches the end of its upward movement. Then, when the switch S3 is turned on, the one-shot circuit produces a single pulse which is applied to actuate the constant current circuit 16 to produce a constant current. Therefore, the coil M3 is supplied with the current. Thus, the motor serving as the electromagnetic drive source starts to rotate, drives the leading blades 100, 102 and 103 of the shutter to run down, initiating an exposure. Further, when the switch S3 is turned on, the transistor Tr2 is rendered non-conducting. Therefore, the condenser C1 starts charging. Since the condenser C1 is charged with current from the collector of the transistor Tr1, and since the intensity of collector current depends upon the output of the shutter time setting circuit 7, the speed at which the condenser C1 is charged is determined by the preset value of shutter time. In a time interval equal to the preset value of shutter time, the voltage on the condenser C1 reaches a predetermined level, causing the comparator CP3 to change its output to a high level. The high level output signal is applied through the OR gate G1 to the one-shot circuit 13, and the one-shot circuit produces a single pulse. Therefore, the constant current circuit 17 produces a constant current with which the coil M4 is supplied. Since the coil M4 is part of the motor serving as the electromagnetic drive source as has been mentioned above, the trailing blades are driven to move as the motor rotates, thus terminating the exposure.

It is noted here that the period of energization of each of the coils M3 and M4 is controlled by a one-shot circuit, and after the shutter has run down, a latching means is acted on. Therefore, the shutter curtains are prevented from accidentally moving from the latched positions. Further, because of the limited period of energization of the coils, the consumption of electrical energy can be greatly reduced.

Next, assuming that the battery voltage lies between the above-described first and second levels, the voltage appearing at the junction point, b, of the series connected circuit in the battery voltage detecting circuit is then lower than the reference voltage Vc. When the power switch So is turned on, the comparator CP2 produces an output signal of high level. Responsive to this, the analog switch AS changes its position to NO. Therefore, regardless of the preset value of shutter time, information representing, for example, 1/60 second is produced from the shutter time setting circuit. Then, the computer circuit operates on this longer shutter time value with the object brightness value and the film speed value to derive an exposure value, i.e. aperture value. Then, when the release button is depressed, as in the first case, the mirror flips upward followed by the storage of the exposure value on the condenser C2 and then by the automatic adjustment of the diaphragm to this setting. Further, the coil M3 is supplied with current, causing the leading blades of the shutter to run down. Then, when the voltage on the condenser C1 reaches a certain level, the comparator CP3 changes its output to a high level at which time the coil M4 initially is energized, thus terminating the exposure. Although the shutter is operated in the manner mentioned above, since an output representing the predetermined value of shutter time is produced by the shutter time, setting circuit 7, the operation of the shutter creates a time interval not necessarily equal to the preset value of shutter time. It is also noted that since this time interval is so long that the deviation of the speed of movement of the shutter curtain from the ideal value has no appreciable influence on the net exposure time, and that the periods of energization of the coils M3 and M4 do not overlap each other to permit the full opening of the exposure aperture. Even when the preset value of shutter time is, for example, faster than 1/60 second, an actual adjustment of the shutter time to 1/60 second is automatically provided. For this reason, even when the battery voltage happens to be lower than the first level necessary to assure the production of a constant current from the circuit, and therefore the shutter curtain cannot move at its normal speed, the exposure control is not greatly influenced. Therefore, it is possible to take photographs which later will be found to be acceptable.

It is further noted that since the coils M3 and M4 are not energized at the same time as the time interval is so determined, there is no possibility of the occurrence of a further lowering of the battery voltage below the second level at a time during the movement of the shutter curtain, thus preventing the shutter curtain from being stopped from further movement.

In this second case, as has been mentioned above, the output of the comparator CP2 is changed to high level at which time the light-emitting diode LED1 is lit, thus indicating the fact that the battery voltage has fallen to an intermediate point between the first and second levels and therefore the fact that the shutter time has been changed.

Next, assuming that the battery voltage is below the second level, the voltages appearing at the junction points, a and b of the series connected circuit in the battery voltage detecting circuit then become lower than the reference voltage Vc. When the power switch So is turned on, the comparators CP1 and CP2 change their outputs to a high level. Therefore, the magnet M1 is supplied with the high level signal through the OR gate so that even when the switch S1 is turned on by the actuation of a camera release, the magnet M1 is left deenergized, thus inhibiting further operation of the camera.

In this case, the light-emitting diode LED2 is lit, indicating the fact that the camera is locked from release because of lowering of the battery voltage below the second level.

Next, assuming that the battery voltage happens to fall below the second level at a time during the exposure operation, though the aperture control and shutter control occur as in the above, when the voltage drop occurs during the shutter time control, the comparator CP1 produces a high level output signal. This high level signal is applied through the OR gate G1 to the one-shot circuit 13 and therefore the constant current circuit 17 is actuated as soon as the battery voltage passes through the second level. Then, the coil M4 is supplied with current, thus terminating the exposure. That is, regardless of whether the preset value of shutter time, or the fixed longer value of 1/60 second is provided, the shutter is caused to close as soon as the battery voltage reaches the second level. Thus, it is made possible to prevent the shutter from being unintentionally opened.

As has been described in great detail, in the camera of the invention, when the battery voltage falls below a predetermined level, the shutter time is automatically changed from a preset value to a predetermined or fixed longer value. This has the advantage that even when the shutter curtain is made to run down at an abnormal speed as it is directly driven by an electromagnetic drive source such as motor, a correct exposure can be taken.

It should be pointed out that in the above embodiment, a shutter priority camera is employed. However, is also possible that even when the shutter time is automatically formed as in a diaphragm priority camera, the shutter time can be switched to a longer value automatically in response to detection of lowering of the battery voltage. Thus, the present invention is applicable to the diaphragm priority camera.

What is claimed is:
1. A camera comprising:
    (a) a power supply circuit for supplying a voltage;
    (b) movable shutter means for providing a camera shutter time and being arranged to be fully open when the shutter time exceeds a certain value;
    (c) driving means for producing a driving force to drive the shutter means in response to said voltage from the power supply circuit, said driving means driving said shutter means to move at a constant normal speed when said voltage is above a predetermined value;
    (d) a detecting circuit for detecting the voltage, said detecting circuit producing a signal when said voltage corresponds to said predetermined value;
    (e) shutter time signal forming means for forming a shutter time signal; and
    (f) a shutter control circuit coupled to said driving means for controlling the shutter time and being arranged to have a first mode for controlling the shutter time in accordance with the shutter time signal and a second mode for providing a shutter time longer than a certain value above which the shutter means is fully open said controlling circuit being operative in the second mode in response to the signal from the detecting circuit.
2. A camera comprising:
    (a) a power supply circuit for supplying a voltage;
    (b) a shutter mechanism, said mechanism including a movable shutter leading circuit and a movable shutter trailing curtain for providing a camera shutter time;
    (c) driving means for driving the shutter mechanism, said driving means driving said shutter mechanism to move at a constant normal speed when said voltage is above a predetermined value;
    (d) a detecting circuit for detecting the voltage, said detecting circuit producing a signal when said voltage corresponds to a value below said predetermined level;
    (e) shutter time signal forming means for forming a shutter time signal; and

(f) a shutter control circuit coupled to said driving means for controlling the shutter time and being arranged to have a first mode wherein the shutter time is controlled in accordance with said shutter time signal and a second mode wherein the shutter time is adjusted to a value longer than the maximum value obtained by the overlapping periods of movement of said shutter leading curtain and said trailing curtain, and means for switching said shutter control circuit to the second mode in response to the signal from said detecting circuit.

3. A camera comprising:
(a) a power supply circuit for supplying a voltage;
(b) movable shutter means for providing a camera shutter time;
(c) driving means for driving the shutter means, said driving means producing a driving force for driving the shutter means in response to said voltage from the power supply circuit;
(d) a detecting circuit for detecting the voltage of said power supply circuit, said detecting circuit producing a first signal when said voltage reaches a level corresponding to the voltage necessary to render the driving means operative;
(e) shutter time signal forming means for forming a shutter time signal; and
(f) a shutter control circuit for performing a time counting operation based on said shutter time signal and producing a shutter closing signal after a time interval corresponding to the shutter time signal to actuate said driving means, said shutter control circuit producing said shutter closing signal in response to said first signal when said first signal is produced from said detecting circuit at the time during the time counting operation of said shutter control circuit based on the shutter time signal.

4. A camera comprising:
(a) a power supply circuit for supplying a voltage;
(b) movable shutter means for providing a camera shutter time;
(c) driving means for producing a driving force to drive the shutter means in response to said voltage from the power supply circuit, said driving means driving said shutter means to move at a constant normal speed when said voltage is above a predetermined value;
(d) a detecting circuit for detecting the voltage, said detecting circuit producing a signal when said voltage corresponds to a value below said predetermined value;
(e) shutter time signal forming means for forming a shutter time signal; and
(f) a shutter control circuit for controlling the shutter time on the basis of said shutter time signal, said shutter control circuit adjusting the shutter time to a certain value in response to the signal from said detecting circuit when said shutter time signal represents a shorter value than the certain shutter time value.

5. A camera according to one of claims 1, 2, 3 and 4, wherein said detecting circuit produces a second signal when said voltage is below a second level necessary to render said driving means operative, and including means responsive to said second signal for inhibiting a shutter release operation.

6. A camera according to one of claims 1, 2 and 4, wherein said shutter time signal forming means includes first means for producing said shutter time signal and second means for producing a predetermined long shutter time signal, and including changeover means responsive to the signal from said detecting circuit for interchanging the shutter time signal from said first means with the predetermined long shutter time signal from the second means so that said shutter control circuit operates in response to the signal from the second means.

7. A camera according to claim 3, wherein said detecting circuit produces said first signal when said voltage is slightly higher than the voltage necessary to render said driving means operative.

8. A camera comprising:
(a) a power supply circuit for supplying a voltage;
(b) movable shutter means for establishing a camera shutter time;
(c) driving means for producing a driving force to drive said shutter means in response to the voltage from the power supply circuit and for driving said shutter means at a constant normal speed when the voltage is above a predetermined value;
(d) a detecting circuit for detecting the voltage and producing a signal when the voltage corresponds to a value below said predetermined value;
(e) shutter time signal forming means for forming a shutter time signal; and
(f) a shutter control circuit for controlling the shutter time on the basis of said shutter time signal and for adjusting the shutter time to a predetermined value in response to the signal from said detecting means so that even if the shutter time signal is for a short shutter time, the shutter control circuit is adjusted to a predetermined long time in response to the signal from the detecting circuit.

9. A camera comprising:
(a) a power supply circuit for supplying a voltage;
(b) movable shutter means for providing a camera shutter time;
(c) driving means for driving the shutter means and for producing a driving force to drive the shutter means in response to said voltage from the power supply circuit;
(d) a detecting circuit for detecting the voltage of said power supply circuit and for producing a control signal when said voltage level is reduced to a predetermined level;
(e) shutter time signal forming means for forming a shutter time signal; and
(f) a shutter control circuit for performing a time counting operation based on said shutter time signal and for producing a shutter closing signal after a time interval corresponding to the shutter time signal to actuate said driving means, said shutter control circuit being arranged for producing said shutter closing signal in response to said control signal when said control signal is produced by said detecting circuit during the time counting operation of said shutter control circuit based on the shutter time signal.

* * * * *